US009264623B2

(12) United States Patent  (10) Patent No.: US 9,264,623 B2
Hirano  (45) Date of Patent: Feb. 16, 2016

(54) SYSTEM AND METHOD FOR DISPLAYING CONTENT ON A TELEVISION IN STANDBY MODE

(71) Applicant: SONY CORPORATION, Tokyo (JP)

(72) Inventor: Kazumi Hirano, Barcelona (ES)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/285,043

(22) Filed: May 22, 2014

(65) Prior Publication Data

US 2014/0253700 A1  Sep. 11, 2014

Related U.S. Application Data

(63) Continuation of application No. 12/832,506, filed on Jul. 8, 2010, now abandoned.

(30) Foreign Application Priority Data

Jul. 9, 2009  (EP) ..................................... 09165002

(51) Int. Cl.
*H04N 7/18* (2006.01)
*H04N 5/232* (2006.01)
*H04N 5/63* (2006.01)

(52) U.S. Cl.
CPC ....... *H04N 5/23293* (2013.01); *H04N 5/23219* (2013.01); *H04N 5/63* (2013.01)

(58) Field of Classification Search
CPC ........................ H04N 5/23219; H04N 5/23293
See application file for complete search history.

(56) References Cited

U.S. PATENT DOCUMENTS

| | | | |
|---|---|---|---|
| 6,614,987 B1 | 9/2003 | Isamail et al. | |
| 2002/0186867 A1 | 12/2002 | Gutta et al. | |
| 2003/0225777 A1 | 12/2003 | Marsh | |
| 2006/0190357 A1* | 8/2006 | Fuchs et al. | 705/27 |
| 2007/0273675 A1 | 11/2007 | Wangler | |

(Continued)

FOREIGN PATENT DOCUMENTS

| | | |
|---|---|---|
| JP | 2006-100881 | 4/2006 |
| WO | WO 02/32136 A2 | 4/2002 |

OTHER PUBLICATIONS

Combined Chinese Office Action and Search Report issued Oct. 24, 2013 in Patent Application No. 201010225810.9 with English Translation.

(Continued)

*Primary Examiner* — Jay Patel
*Assistant Examiner* — Francis G Geroleo
(74) *Attorney, Agent, or Firm* — Oblon, McClelland, Maier & Neustadt, L.L.P.

(57) ABSTRACT

A system and method for displaying content on a television in standby mode. The system can have storage for storing face data of one or more users and for storing preference data associated to the face data, where the preference data indicates preferences of the user, a display for displaying content, and a standby indicator for indicating that the television is in standby mode. In a case that the television is in standby mode, a front camera for capturing an image of a user is activated. The system can also have a recommendation device for searching the attribute data of content currently available and for selecting, in a case that the captured image corresponds to one of the store face data, at least one content to be displayed that has attribute data matching the associated stored preference data.

18 Claims, 9 Drawing Sheets

(56) References Cited

U.S. PATENT DOCUMENTS

| | | |
|---|---|---|
| 2008/0132287 A1 | 6/2008 | Choi |
| 2008/0141297 A1* | 6/2008 | Dawson et al. ................ 725/32 |
| 2009/0298537 A1 | 12/2009 | Choi |
| 2010/0048242 A1 | 2/2010 | Rhoads et al. |

OTHER PUBLICATIONS

A Context Sensitive Public Display for Adaptive Multi-User Information Visualization, Ana Hilda Morales-Aranda, Oscar Mayora-Ibarra, Third International Conference on Automatic and Autonomous Systems (ICAS '07).

* cited by examiner

SYSTEM AND METHOD FOR DISPLAYING CONTENT ON A TELEVISION IN STANDBY MODE

CROSS-REFERENCE TO RELATED APPLICATIONS

This application is a continuation application of U.S. application Ser. No. 12/832,506, filed Jul. 8, 2010, the entire content of which is incorporated herein by reference, and claims foreign priority to European application Serial No. 09165002.8, filed Jul. 9, 2009.

The present invention relates to a system and a method for displaying content on a television in standby mode. More specifically, the present invention relates to a system and method making use of a television even in standby mode.

BACKGROUND

In recent times televisions become more sophisticated and of increasing functionality. Additionally, televisions become more and more integrated into hi-fi networks or other types of networks having different sources at their disposal. During watching a television program, the functionality of the television can be fully used and enjoyed. On the other hand, when no television program is watched and the television is in standby mode or turned off, the television is not used anymore even though it might provide a variety of functions.

BRIEF SUMMARY

It is therefore the objective problem of the present invention to improve the prior art. Specifically, it is an object of the present invention to provide a system and a method which allow to display content on a television even in standby mode and adapted to the preferences of a user.

The present invention according to a first aspect relates to a system for displaying content on a television in standby mode, comprising a storage for storing face data of one or more users and for storing preference data associated to the face data, said preference data indicating preferences of the user, a display for displaying content, a standby indicator for indicating that the television is in standby mode, wherein in case that the television is in standby mode activating a front camera for capturing an image of a user, and activating a recommendation device for searching the attribute data of content currently available and for selecting in case that the captured image corresponds to one of the store face data at least one content to be displayed having attribute data matching the associated stored preference data.

The present invention according to a further aspect relates to a method for displaying content on a television in standby mode, comprising the steps of storing face data of one or more users and for storing preference data associated to the face data, said preference data indicating preferences of the user, displaying content, indicating that the television is in standby mode, wherein in case that the television is in standby mode activating a front camera for capturing an image of a user, and activating a recommendation device for searching the attribute data of content currently available and for selecting in case that the captured image corresponds to one of the store face data at least one content to be displayed having attribute data matching the associated stored preference data.

Advantageous features and embodiments are the subject matter of the dependent claims.

BRIEF DESCRIPTION OF THE DRAWINGS

The present invention will now be explained in more detail in the following description of preferred embodiments in relation to the enclosed drawings in which.

DETAILED DESCRIPTION

Figure 1:
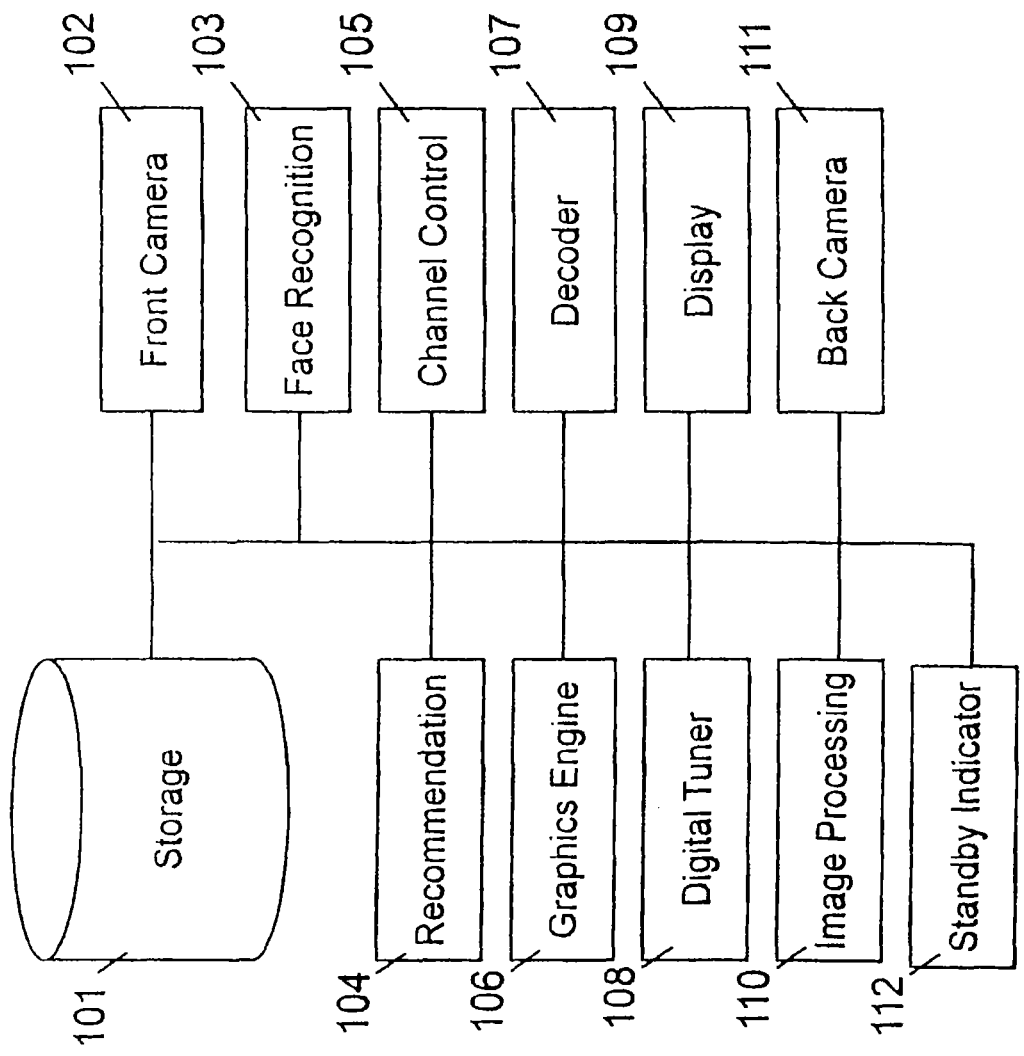
FIG. 1 shows a system for displaying content on a television in standby mode according to the present invention.

FIG. 1 shows a system 100 for displaying content on a television in standby mode according to the present invention. The components shown in FIG. 1 can be all or partly integrated into a television. If only a part of the components is integrated into a television, then the other components can be integrated into one or more external components or devices which are connected to and in data communication with the television. In the following description, the embodiment is described that all components are integrated into a television; however, as mentioned above, the present invention is not limited to such an embodiment.

The system 100 as shown in FIG. 1 of course comprises all further features necessary enabling the functionality, such as a power source or the like, which are omitted in the figures for the sake of clarity.

The system 100 comprises a storage 101. The storage 101 can be divided into one or more storage parts being volatile and/or non-volatile memory parts.

The system 100 further comprises a front camera 102 which is adapted to take pictures or images from an object in the environment of the system 100, specifically from objects in the front of the system 100. The term "front" hereby is intended to refer to those parts of the environment from which the display of the television can be seen. The front camera 102 can be adapted to take still images and/or video. In one embodiment the front camera 102 is movable, i. e. turnable in order to also take pictures or images from objects which are not in the front of the system 100.

The front camera 102 is connected to and in data communication with a face recognition device 103. The face recognition device 103 is adapted to carry out a face recognition based on images submitted by the front camera 102. The face recognition is hereby carried out according to known methods, for example the algorithms according to Viewdle or UIUC. But also any other present or future face recognition algorithm can be used.

The system 100 further comprises a display 109 for displaying video content or image content. The display 109 can be any type of known or future display devices, for example liquid crystal display panels (LCD), thin-film transistor displays (TFT), color-sequential displays, plasma display panels (PDP), digital micro-mirror devices or organic light emitting diode (OLED) displays or any other type of display. Connected to the display is a graphics engine 106 which controls the display 109.

The system 100 further comprises a decoder 107 for receiving television programs which are broadcast. The term "television program" is intended to encompass all types of video content, which are displayable on a display, panel or monitor. A digital tuner 108 within the system 100 is adapted to select a frequency in order to show a specific television program and therefore also a channel control 105 is adapted to control the digital tuner 108 in order to select the channel to be displayed on the display 109 and to change the frequency of the digital tuner 108.

The system 100 optionally comprises a back camera 111, which is like the front camera 102 adapted to take pictures or images either in the form of a single image or video. The back camera 111 hereby covers the environment of the system 100 which is not covered by the front camera 102, i. e. the back camera can take images of objects within parts of the environment from which the display cannot be seen. Specifically, if the system is placed near a wall, then the back camera 111 is adapted to take a picture of the wall.

However, FIG. 1 is only an exemplary embodiment of a system according to the present invention, but the present invention is not limited to the shown components and structure, but can be adapted to any other television enabling a reception of television programs from an arbitrary source and enabling the display of the television programs.

The system 100 further comprises an image processing device 110 which is adapted to process images and/or video received either from the front camera 102, from the back camera 111 or stored in the storage 101. Image processing can comprise changing the size, changing the resolution, changing the color, sharpen, turn, invert or any other type of image processing.

The system 100 additionally comprises a standby indicator 112 indicating whether the television, into which the system 100 is integrated or to which the system 100 is connected, is in standby mode. That means the standby indicator 112 indicates whether the television is currently used for watching television programs or whether the television is currently switched off or put into standby mode. The standby indicator 112 can either automatically indicate a standby in case that the watching of television programs is ended by a user or the standby indicator can be triggered by a corresponding function or key, for example the power key, which has to be pressed or activated by the user. That means that the standby indicator 112 either automatically based on predefined condition indicates a standby or that the standby indicator 112 based on manual actions accomplished by the user indicates a standby.

The system 100 additionally comprises a recommendation device 104 for selecting content stored in the storage 110 and/or for selecting content from any other source, e. g. the front camera 102, the back camera 111 or any other source connected to the system 100 to be displayed on the display 109. The selection process will be explained in detail in the following.

The term "content" when used in the present specification is intended to refer to any type of data or information comprising displayable parts. That means that the content can either consist of displayable data or information or the content can comprise displayable data or information. Content can for example comprise text, images, video or any other type of displayable data. The content additionally can also comprise sound data, which can be played by a corresponding speaker or the like, attached to the system 100. The content can also comprise further data or information functioning as instruction for further devices in order to enable not only a displaying of the content but in order to enable also the activation of further devices such as sound, light and so on.

According to the present invention in the storage 101 face data of one or more users are stored and additionally preference data of the one or more users are stored and associated with the stored face data.

The preference data comprises information on preferences, habits and/or key words indicating preferences of the user with respect to content. The preference data can hereby have been input manually by a user and/or retrieved automatically by the system. The system can for example monitor the habits of a user when watching television programs and therefrom extract preference data of the user.

If the user stops watching television then either automatically or manually the standby indicator 112 will indicate the standby mode of the television.

Then the following process is activated. The front camera 102 captures an image of the user. The face recognition device 103 then accomplishes a face recognition of the face within the image captured by the front camera 102.

The recognized face is transmitted to the recommendation device 104, which compares the recognized face with face data stored in the storage 101. Alternatively, the comparison step can also be carried out by the face recognition device 103. If the captured face data correspond to face data stored in the storage 101, then the recommendation device 104 will select a content out of all contents currently available whose attributes matches the preference data stored with the corresponding face data.

More specifically, the recommendation device 104 receives a list of all contents currently available either from the storage 101, from the front camera 102, from the back camera 111, via an external device which is connected to the system 100, via the internet, via the decoder 107 or via any other available source. Usually, content has associated thereto meta data and/or other additional data indicating attributes of the content. Otherwise, the recommendation device 104 can be adapted to analyze the content in order to retrieve attributes of the content.

The recommendation device 104 compares the attributes of the available content with the preference data stored and associated to the stored face data and selects the content for displaying on the display 109 having attribute data matching the preference data of the user.

Figure 2:
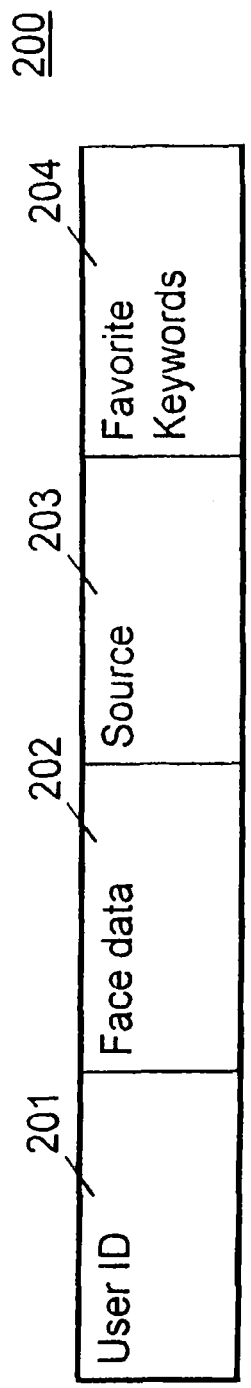
FIGS. 2 and 3 show embodiments of data stored in the storage according to the present invention.
Figure 3:
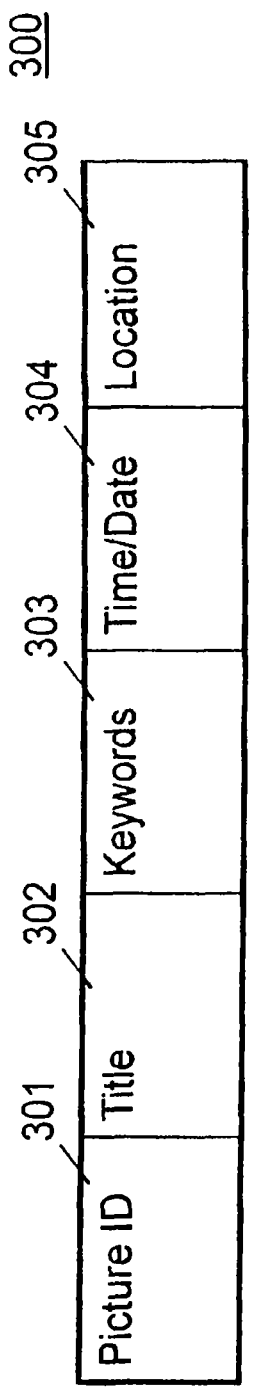

An example of data stored in the storage 101 is shown in FIGS. 2 and 3.

In FIG. 2 and example of a user entry 200 is shown. The user entry in the present embodiment comprises a user identification, i. e. a user ID 201, which uniquely identifies a user. A user ID 201 can be any combination of symbols and/or icons uniquely identifying a user. The user entry 200 further comprises face data 202 of the corresponding user. The face data can either be a stored image and/or a set of data indicating important features within the face of a user in order to enable a proper match between the stored face data 202 and those face data which are transmitted by the face recognition device 103. However, in an alternative embodiment, the user ID 201 can also be omitted.

Together with the face data 202 preference data are stored indicating preferences of the corresponding user. According to a preferred embodiment of the present invention in the user entry 200 source data 203 are stored indicating a preferred source for contents to be displayed. The source data 203 can for example indicate the storage 101 as source, the back camera 111 as source, the front camera 102 and/or any other type of source, e.g. the internet, an external device or the like. Additionally, the source data 203 may indicate a specific group of contents stored within the storage 101 or available via any other source.

In the user entry 200 in a preferred embodiment favorite key words 204 are stored indicating key words for which the recommendation device 104 should search within the available content in order to retrieve content that is preferred by the user.

The user entry 200 in any case at least has to comprise face data 202 and preference data, which in the present example is represented as source data 203 and favorite key words 204, but also any other type of preference data can be stored, for example date and time, gender, age, personal settings or any other type of preference data.

FIG. 3 shows an example of attribute data 300 associated to content, which can comprise or consist of metadata. In case that the content is a picture, the attribute data 300 can for example comprise a picture ID 301 uniquely identifying the picture. Comprised within the attribute data 300 can be further a title 302, e.g. "football game", key words 303 indicating important features or attributes of the content, e.g. "football" or "green", the time and date 304 of creation of the content or of change of the content and location data 305 indicating the location from which the content can be retrieved, i.e. the storage 101, the front camera 102, the internet or the like. Of course the present invention is not limited to the shown attribute data 300 but can comprise any other type of attribute data 300 including metadata indicating features of the content. Additionally or alternatively the image processing device 110 can analyze the content itself in order to retrieve attribute data of the content. For example, if the content has many green pixels within the image, then the image processing device 110 can add "green" to the keywords 303.

According to a preferred embodiment, the user entry 200 is created once by the user. The user triggers the front camera 102 to take a picture of his face in order to store the face data 202 within the user entry 200 in the storage 101. The user ID 201 is either created automatically by the system 100 or the user might have selected his own user ID 201, e.g. his name, a nickname, a symbol, a combination thereof or the like. When creating the user entry 200 the user preferably also chooses one or more sources, from which the content to be displayed should be retrieved and the users' selection is stored as source data 203. The source data 203 can also comprise an indication, which function should be used, i.e. whether a wall function, a mirror function or a picture function should be, which will be explained in detail later on. The user can further input several keywords, e.g. "football", "classic music" and they are stored as favourite keywords 204 in the user entry 200 in the storage 101.

The user can further have stored attribute data 300 of content. Hereby, the content itself can be stored in the storage 101 together with the attribute data 300 or only the attribute data 300 can be stored, whereby the location data 305 indicate the location of the content, e.g. the file path on the storage 101.

As previously explained, the television might have a connection to the internet and thereby content can also be retrieved from the internet together with their attribute data. For example the system 100 can get content together with metadata by parsing the content metadata or related documents like HTML, or by analyzing the content by a corresponding image processing carried out by the image processing device 110. In this case, the location data 305 may be the URL of the content if the content is not stored in the storage 101.

In other words, with the present invention a system and a method is provided which allow to use the sophisticated system of a television even when the television is in standby mode. In order to ensure that the shown contents are really personalized to the user who is currently present, a picture of the user is taken and compared with face data stored in the storage in order to select contents appropriate for the user based on the stored preference data.

In an alternative embodiment also groups of users can be stored. For example the face data of two users are stored and treated as one group associated with preference data. Such a group can comprise people living together in the same household, such as wife and husband or family. The front camera 102 in this case is adapted to capture an image of all users in the vicinity of the system 100, to transmit the data to the face recognition device 103, which in turn recognizes the number of faces and can accomplish a face recognition on each of the faces.

Alternatively or additionally, the face recognition 103 in case that the front camera 102 captures an image comprising several faces and after having recognized two or more faces, can choose only one of them, for example by measuring the face size within the picture and choosing the face which appears as largest face within the image or the like.

In the following the steps carried out according to the method of the present invention will be explained in detail with reference to FIGS. 5 to 10.

Figure 4:
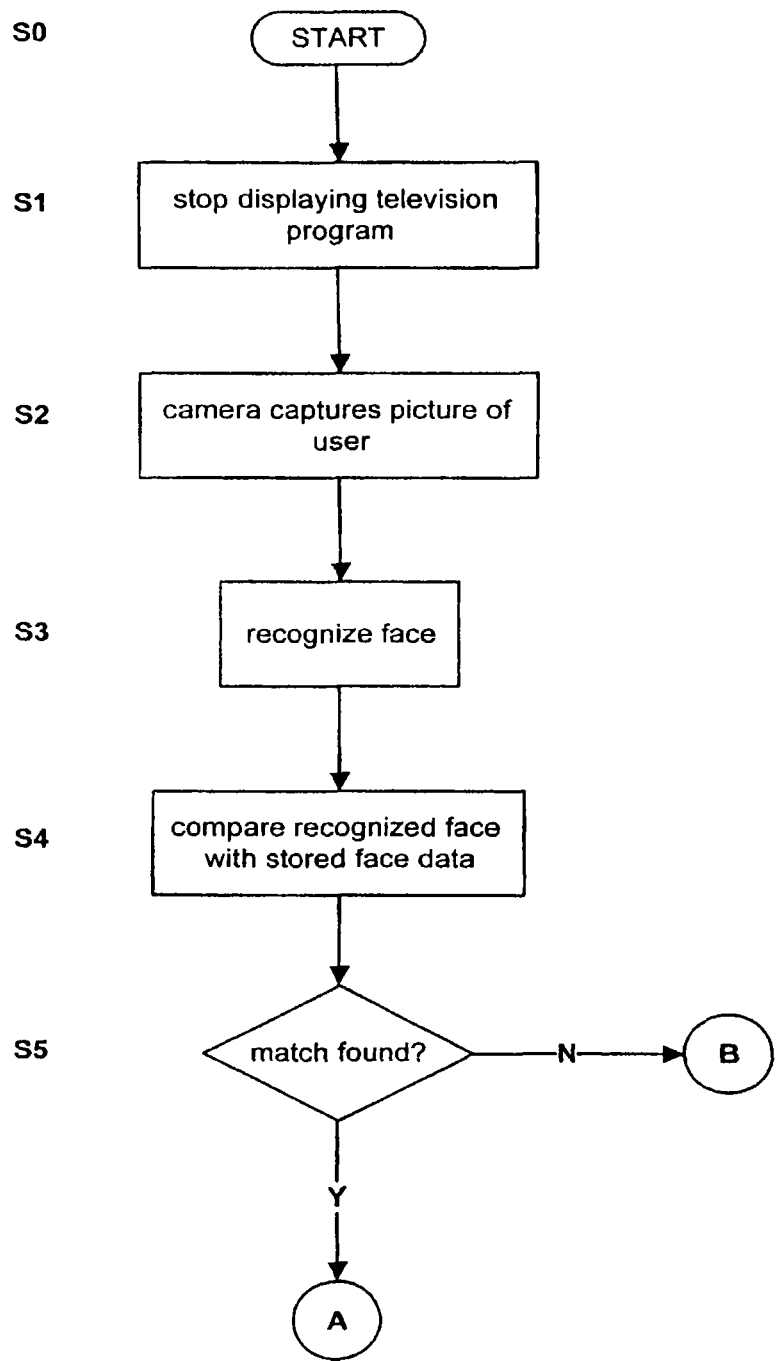
FIGS. 4 to 10 show flow charts with the process steps according to the method of the present invention.

FIG. 4 shows an initial phase of the process. The process starts in step S0. In step S1 the displaying of television programs is ended. That means that in step S1 triggered either automatically or manually the standby indicator 112 indicates the standby of the television. As already explained, the user can press for example the power key of an intelligent television system 100 when the user finished watching a television program. The display 109 will then stop displaying a television program.

In case of a standby then the components of the system 100 are activated and the following steps are carried out. In step S2 the front camera 102 captures a picture of the room and thereby captures a picture of the one or more users being in the vicinity of the system 100. The captured pictures then transmitted to the face recognition device 130 which in the following step S3 recognizes one or more user faces.

As previously described either one of the recognized faces is selected or a part or all faces are treated as a corresponding group. The recognized face is then transmitted to the recommendation device 104 which in the following step S4 compares the recognized face with the face data 202 stored in the storage 101. Alternatively, the comparison can also be carried out by the fact recognition device 103, which then transmits the comparison result to the recommendation device 104.

In the following step S5 the recommendation device 104 checks whether a match has been found between the recognized face data captured by the front camera 102 and the face data 202 stored in the storage 101, i.e. whether the same or a similar face was found within the face data 202 stored in the storage 101. In case that a match is found, then the process continues at point A, which will be described later. Otherwise, if in step S5 it is decided by the recommendation device 104 that no match has been found, then the process continues at point B, which will also be described later.

Figure 5:
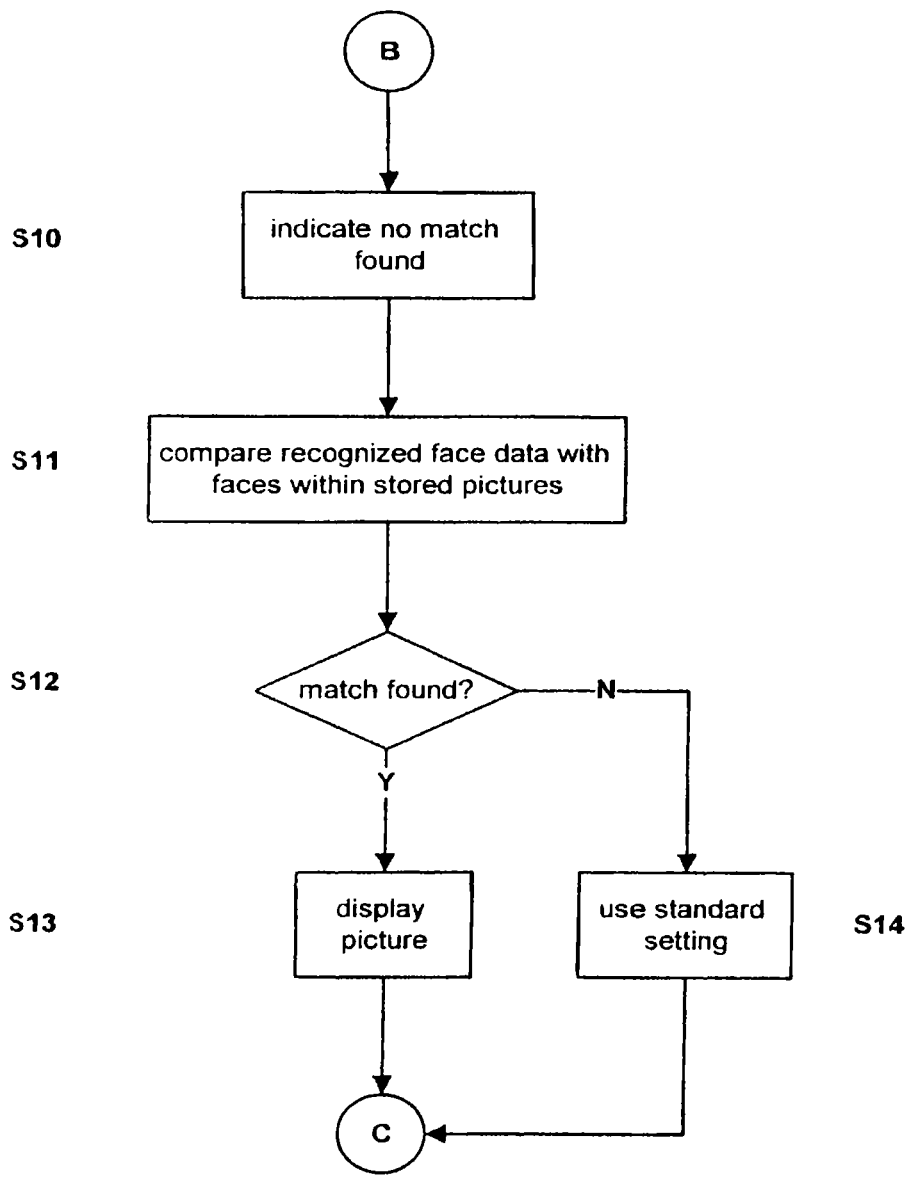

The process starting from point B will now be described with reference to FIG. 5.

In step S10 the recommendation device 104 or the face recognition device 103 indicates that no match was found between the face in the image captured by the front camera 102 and the face data 202 stored in the storage 101. If the face recognition device 103 carried out the matching, then the case of no found match might be indicated to the recommendation device 104 by sending a special user ID to the recommendation device 104 indicating "no user".

That means that currently a user is present whose face is not yet stored as face data in the storage. In the preferred embodiment of the present invention it is assumed that all users who frequently use the television have already stored their face data in the storage 101. If therefore the face of a user cannot be found in the storage 101, he may be a guest or visitor or the like. In order to nevertheless use the television system and to display content which could be adapted to the preferences of the user, whose face data are not stored, in step S11 the recommendation device 104 compares the recognized face captured by the front camera 102 with faces which appear within pictures, video or other types of contents stored within the storage 101. This bases on the assumption that if a user presently is a guest or a visitor, then there might be a relationship between the guest and the regular user, so that there might be the probability that pictures or videos are present within the storage which show the user who is currently the guest or visitor.

If more than one face was recognized in the captured image by the face recognition device 103, then it is also possible that the recommendation devices 104 searches for pictures and/or videos within the storage comprising some or all of the recognized faces.

If in step S12 it is decided that a match was found then in the following step S13 the found one or more contents are displayed on the display 109. If in step S12 it is decided that no match was found, then in the following step S14 the standard settings can be used. The standard settings can hereby be that no content is displayed at all, that content is randomly selected and displayed or any other type of setting can be used.

The process then in any case continues with point C.

Figure 6:
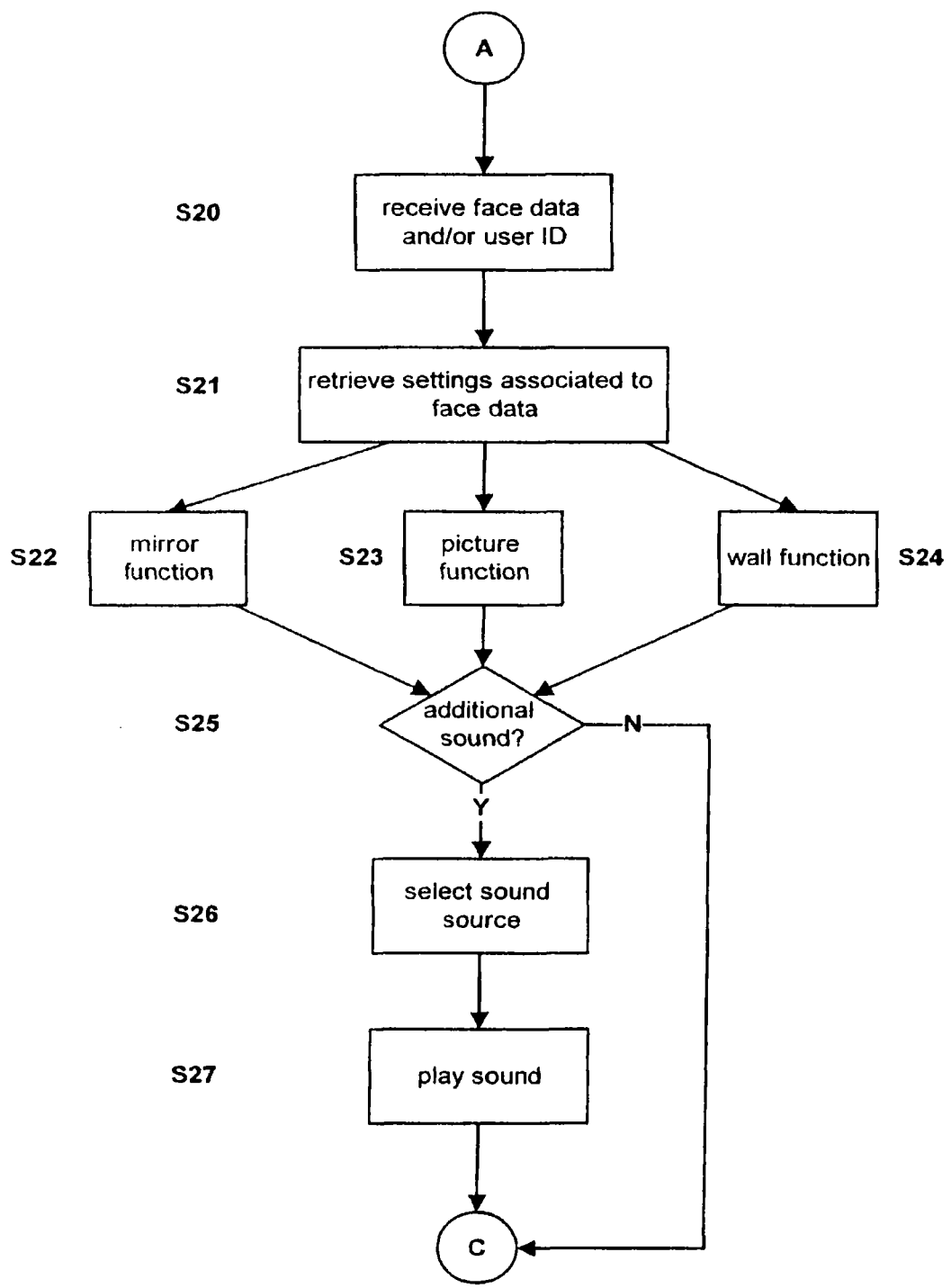

The process starting from point A will now be explained with reference to FIG. 6. This happens in the case that a match is found between the face within the image captured by the front camera 102 and the face data 202 stored within the storage. The comparison process can be carried out by the recommendation device 104 or by the face recognition device 103. In the latter case, the face recognition device can send the corresponding user ID 201 associated to the found face data 202 to the recommendation device 104.

In the following step S20 the recommendation device 104 retrieves the face data and optionally the user ID from the storage 101. In the next step S21 the settings or preference data associated to the stored face data 202 are retrieved. The process then depending on the settings, e. g. dependent on the source data 203, continues with different functions. Otherwise, if no source data 203 are present or if no other settings indicate which function should be used, then either automatically one of the functions can be used or one of the functions can be randomly selected.

The process then depending on the selected function continues with a mirror function in step S22, a picture function in step S23 or a wall function in step S24. The different functions will be explained in detail later on.

In any case the process then continues with step S25 where it is checked whether additional sound, i. e. sound or other features in addition to displaying the content on the display 109 is provided. If this is the case, then in step S26 the sound source is selected. Hereby, the content can either comprise associated metadata already indicating a specific sound, sound source or the like or otherwise a sound source can be selected depending on other parameters. For example the recommendation device 104 can analyze the attribute data 300 of the content or the content itself in order to find an appropriate type of sound. If for example one of the key words is "tree" or if the recommendation device 204 analyzes the content and finds that there is nature or trees within, then as sound a quiet and slow type of sound may be selected.

In the next step S27 the sound is played in addition to the content displayed on the display 109. As previously described, the content can also comprise other attribute data 300 comprising instructions for other devices. In the above example, when a content comprising nature is displayed and a corresponding quiet sound is selected, then with the additional instructions the lights may be dimmed in order to create a relaxing atmosphere.

Otherwise if in step S25 it is decided that no additional sound or other types of instructions to external devices is provided, then the process continues with point C.

Also after having played the sound or after having activated other devices in step S27 the process continues with point C.

Figure 7:
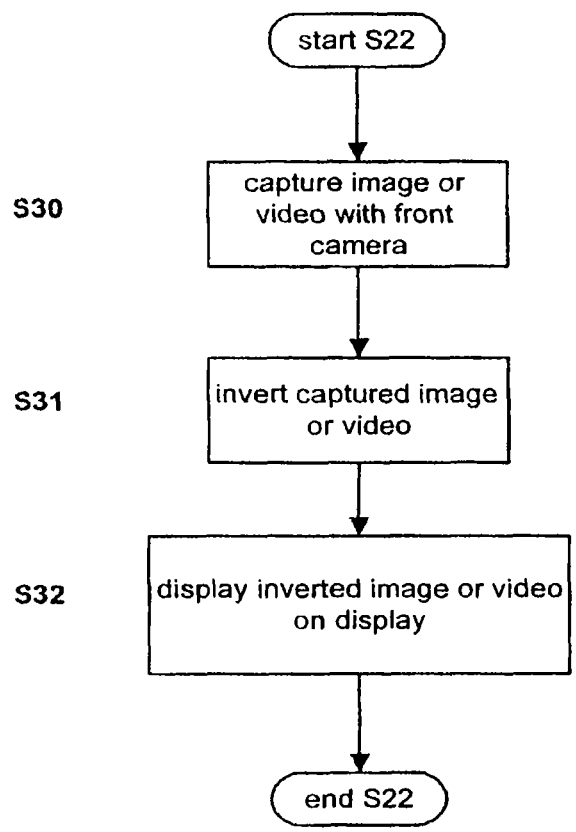

With reference to FIG. 7 now the mirror function of step S22 will be explained in detail. If the mirror function is selected, then in step S30 an image or a video is captured with the front camera 102. In the following step S31 the image processing device 110 inverts the captured image or video, i. e. turns it around a vertical axis.

In the next step S32 the inverted image or video is displayed on the display 109, thereby having a sort of mirror function, i. e. in this case on the display 109 an image or video is displayed representing a mirror of the environment in front of the front camera 102. The television can thereby be used as mirror.

Figure 8:
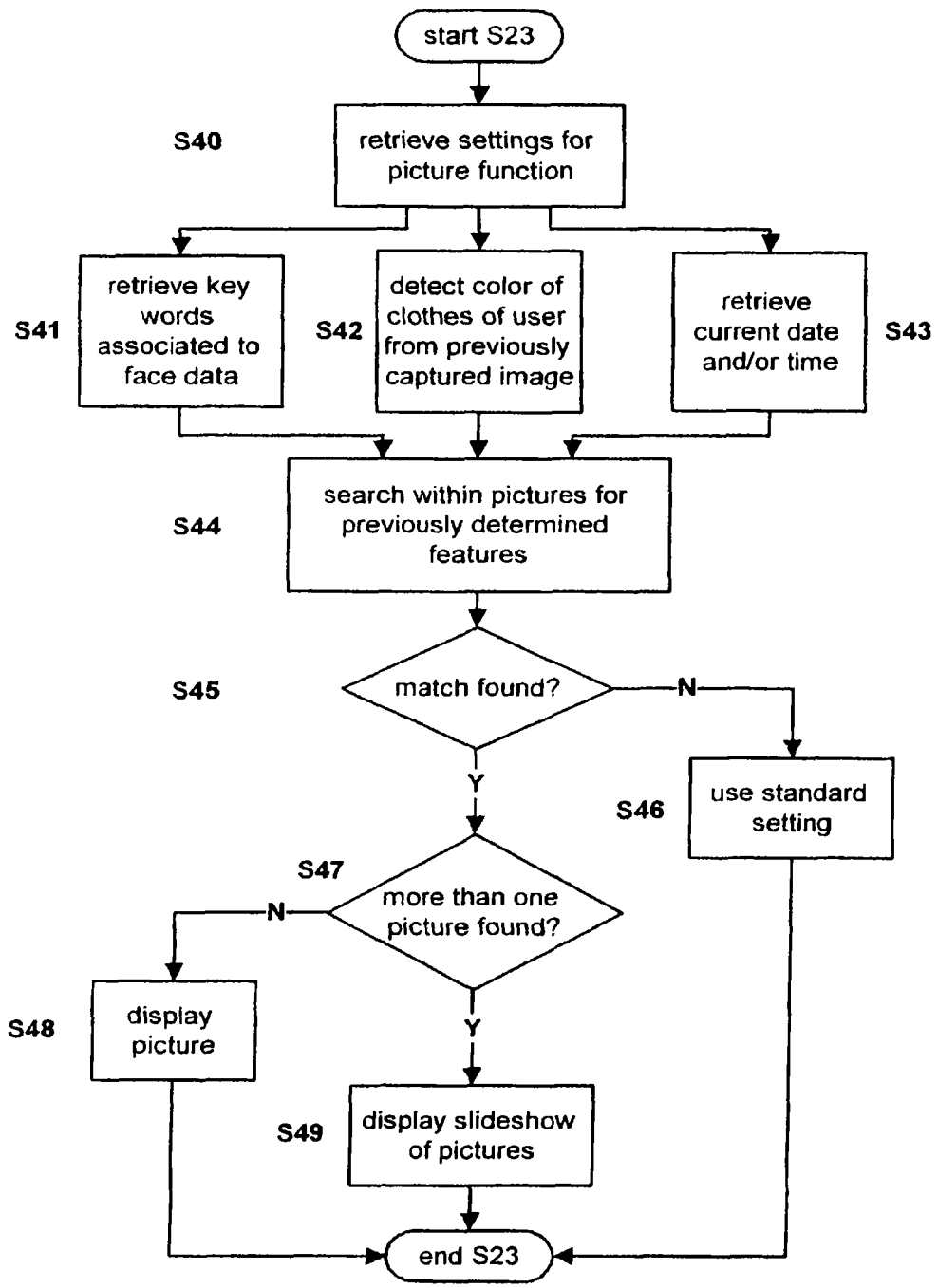

With reference to FIG. 8 now the process steps are explained in case that the picture function is selected in step S23.

In step S40 the settings for the picture function are retrieved. These can be either settings stored within the preference data within the user entry 200 or can be settings stored in any other part of the storage 101. That means that the settings can comprise preference data associated to specific face data 202 and/or can be general settings applicable to more than one or all user entries 200. The settings indicate which type of search conditions should be used in order to select content to be displayed. Depending on the settings one or more of the following possible information is retrieved in order to find content matching the preferences of the user.

In step S41 key words 204 associated to the face data 202 and stored within the storage can be retrieved. These key words can be used in order to search the attribute data 300 of content in order to find content matching the preferences of a user.

Alternatively or additionally, in step S42 the color of the clothes the user is currently wearing is detected from the previously captured image, i. e. the image captured by the front camera 102. This color can be also used in order to find content which matches the actual mood and situation of the user. If the user for example is carrying green clothes, then content related to nature or to green pictures can be selected by a corresponding analysis carried out by the image processing device 110 and/or the attribute data 300 can be searched for the keyword "green".

Alternatively or additionally, in step S43 the current data and/or time can be retrieved and this information can also be used in order to find content to be displayed which matches the present situation. For example, if the current time is 3 pm on April $1^{st}$, then the recommendation device 104 may select images and/or videos which were created and/or changed around 3 pm on an April $1^{st}$.

Using either a part or all of the previous described conditions, in step S44 the available content is searched, for example all pictures stored within the storage 101 are searched for the previously determined features. Alternatively or additionally, also all other sources providing displayable content can be searched. Even though the function is referred to as "picture function" this function includes the displaying of still images as well as videos.

It can be determined that only pictures and/or videos are selected which match all of the previously determined features or otherwise a sort of priority can be set for the different features so that also pictures and/or videos which do not match all of the features are selected.

In the following step S45 it is checked whether a match has been found. If no match is found then in the following step S46 again standard settings can be used. Otherwise, if in step S45 a match was found, then in step S47 it is checked whether more than one picture and/or video matching the conditions has been found. If this is not the case then in step S48 the single found picture or video is displayed on the display 109. The process of step S23 then ends.

Otherwise, if in step S47 it is decided that more than one picture and/or video has been found, then in step S49 the found pictures and/or videos are displayed as a slide show, for example by changing the display every 30 seconds. In any case then step S23 ends.

Figure 9:
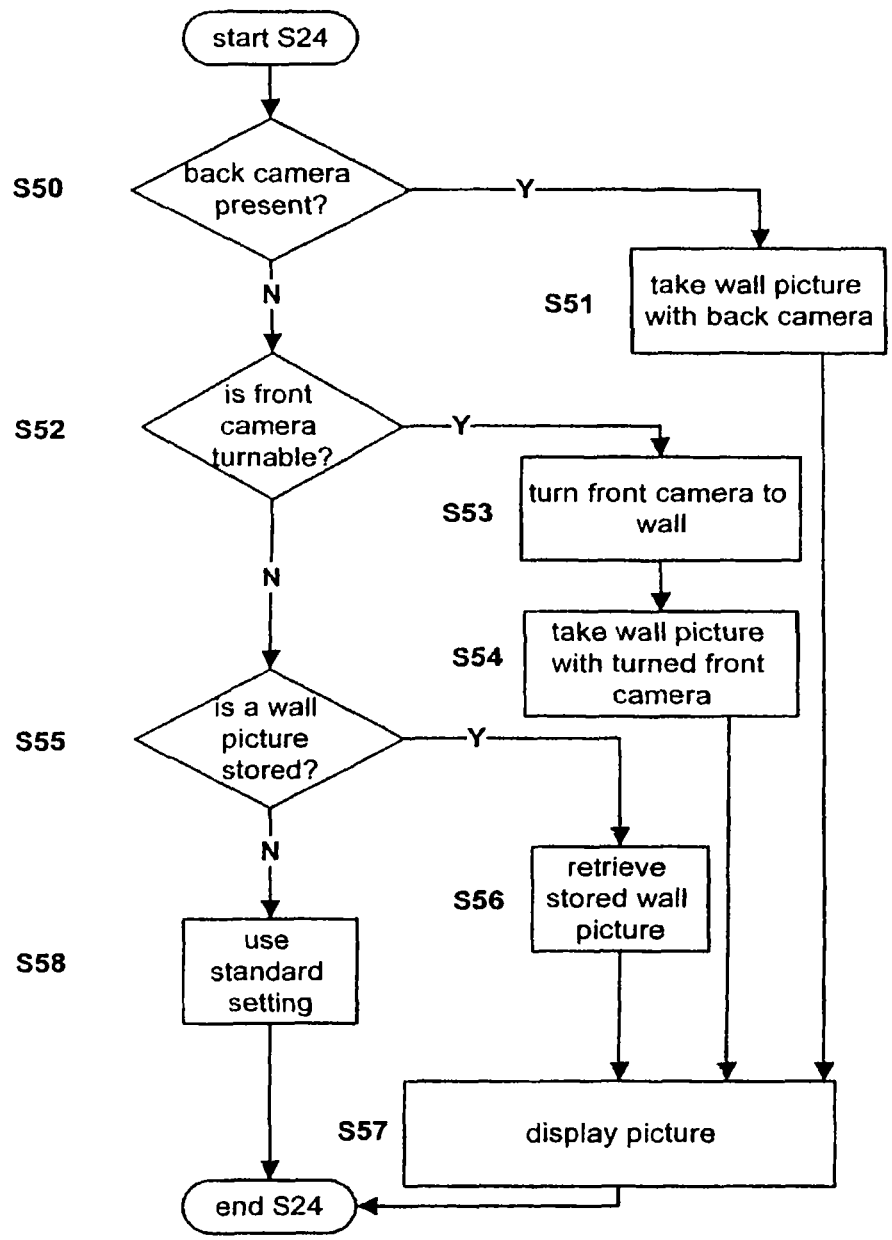

With respect to FIG. 9 in the following the process steps are described when the wall function in step S24 is selected.

In step S50 it is checked whether a back camera 111 is present. If a back camera is present then in the following step S51 the back camera 111 will take a wall picture of the wall behind the television and then the wall picture will be displayed in step S57 on the display 109. The color of the wall picture can be adjusted dependent on the condition of the environment, e.g. if the room is dark, the wall picture is made darker by changing colors.

Otherwise, if in step S50 it is decided that no back camera 111 is present, then in the following step S52 it is checked whether the front camera 102 is turnable.

If this is the case then in step S53 the front camera 102 is turned backwards to the wall and in step S54 a wall picture is taken with the turned front camera 102. The taken wall picture is then also displayed on the display 109 in step S57.

Otherwise, if in step S52 it is decided that the front camera 102 is not turnable, then in the following step S55 it is checked whether a wall picture is stored in the storage 101. If this is the case then in step S56 the stored wall picture will be retrieved from the storage 101 and displayed on the display 109 in step S57.

In any case it is possible to add an additional step in which the image processing device 110 modifies the captured or stored wall picture before it is displayed. The image processing device 110 can for example change the wall picture based on the current brightness and/or color of the environment or room.

Otherwise, if in step S55 it is decided that no wall picture is stored in the storage 101, then this means that no wall picture at all can be made available and then in the following step S58 the standard settings are used.

The wall function then ends in step S24.

With the wall function the impression can be created that the television is not present at all. This might be of advantage if the television is very large and when switched off seems to take much clearance within the room. In this way it can be created the impression that the television is not present and the room is larger. Further, the user does not have to pay any attention to the television.

Independent of the selected function, the recommendation device 104 can alternatively of additionally show text and/or information on the display 109. For example, information about the present, past or future television programs matching the user preference can be shown, e.g. title, time and date.

Figure 10:
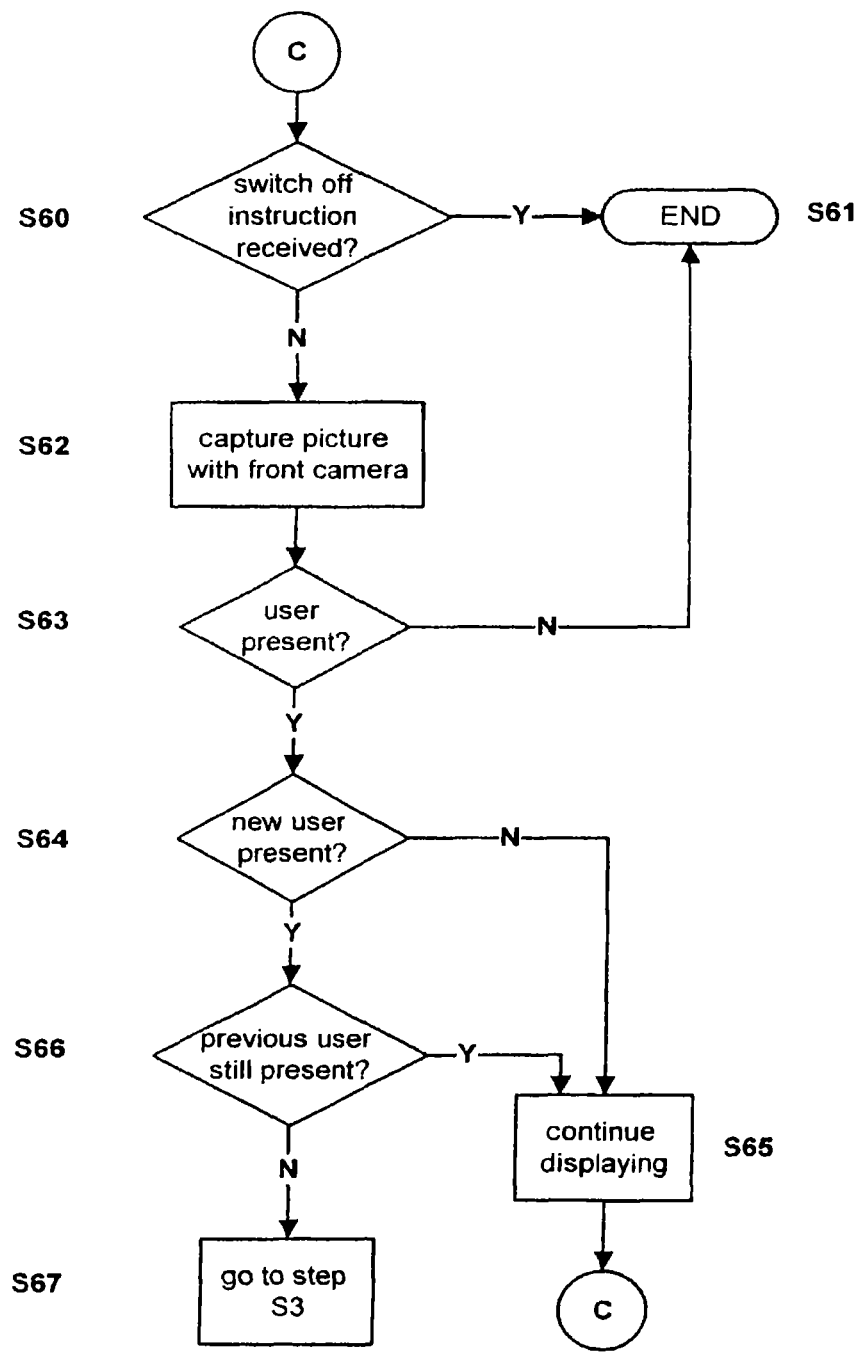

With reference to FIG. 10 now the process starting from point C will be explained.

In step S60 the system 100 checks whether a switch-off instruction has been received. For example the standby indicator 112 indicates that the standby period is over or the complete system of the television is completely turned off, e.g. the power source is stopped. If a switch-off instruction was received then the process ends in step S61. Of course the step of checking whether a switch-off instruction was received can also be accomplished at any other time during the whole process and only for the sake of completeness is shown in the figures.

If no switch-off instruction was received, then in the following step S62 a picture is again captured with the front camera 102. In the next step S63 it is checked whether a user is present. If in step S63 it is found that no user is present anymore then the process ends in step S61 and the system 100 is switched off or the corresponding components are at least deactivated in order to avoid unnecessary power consumption.

Otherwise, if in step S63 it is found that at least one user is present then in the next step S64 it is checked from the image analysis whether a new user is present, i.e. another user than the one for which the content currently displayed is selected. If this is not the case then in step S65 the display function continues. Otherwise, in the following step S66 it is checked whether the previous user is also still present. If this is the case then the presence of the new user is ignored and the displaying continues in step S65.

Otherwise, if in step S66 it is found that the previous user is not present anymore, then the process in step S67 switches again to the process starting from step S3.

The present invention is not limited to the described embodiments. Rather, all features, components and/or steps described herein with reference to one embodiment can also be incorporated into any other embodiment where appropriate.

With the present invention the television can continue to show interesting and attractive multimedia contents even after a user has terminated watching television programs. Further, with the recommendation of contents based on stored user preferences and the automatic detection of a user, content to be displayed can be selected during the standby mode which perfectly suits the preferences of the user who is currently present.

The invention claimed is:

1. A system for displaying content on a television when the television is not displaying any television programs, the system comprising:
    memory to store face data of one or more users and to store preference data associated with the face data, the preference data indicating respective preferences of the one or more users;
    a display to display content items in an output display direction;
    an indicator to indicate that the television is not being used to display any television programs;
    a camera facing a same direction as the output display direction of the display; and
    circuitry configured to, when responsive to the indicator indicates indicating that the television is not being used to display any television programs:
        capture an image of a user using the camera,
        compare face data associated with the captured image to the face data of the one or more users stored in the memory,
        select for display on the display a plurality of content items having attribute data matching the stored preference data associated with one portion of the face data of the one or more users stored in the memory, responsive to the face data associated with the captured image corresponding to the one portion of the face data of the one or more users stored in the memory, and display at the same time the content items on the display, the displayed content items being unique and personalized for the user and adapted to the stored preferences of the user, wherein the circuitry is configured to compare the face data associated with the captured image to face data associated with picture and video files stored in the memory responsive to both of the face data associated with the captured image not corresponding to any portion of the face data of the one or more users stored in the memory, and the face data associated with the captured image corresponding to a plurality of detected faces, and to cause display on the display of an image corresponding to the picture or video file in a case that the face data associated with the captured image is determined to be associated with one or more of the picture and video files.

2. The system according to claim 1, wherein each of the displayed content items functions to enable activation of at least one device of the system.

3. The system according to claim 1, wherein the location data is a file path.

4. The system according to claim 3, wherein the file path is to the memory.

5. The system according to claim 1, wherein the location data is a Uniform Resource Locator (URL) of the content item.

6. The system according to claim 1, wherein the content is retrieved from the Internet.

7. The system according to claim 1, wherein each of the displayed content items includes an image.

8. The system according to claim 1, wherein the preference data includes source data indicating at least one of a favorite source from which the content should be retrieved and a type of content to be displayed.

9. A method for displaying content on a television when the television is not playing any television programs, the method comprising:

determining that the television is not being used to play any television programs; and responsive to said determining that the television is not being used to play any television programs:

capturing an image of a user using a camera, comparing face data associated with the captured image to face data of one or more users stored in memory, selecting for display on a display of the television a plurality of content items having attribute data matching stored setting data associated with one portion of the face data of the one or more users, responsive to the face data associated with the captured image corresponding to the one portion of the face data of the one or more users stored in the memory, and displaying at the same time the content items on the display of the television, the displayed content items being unique and personalized for the user and adapted to the stored settings of the user, wherein said comparing includes comparing the face data associated with the captured image to face data associated with picture and video files stored in the memory responsive to both of the face data associated with the captured image not corresponding to any portion of the face data of the one or more users stored in the memory, and the face data associated with the captured image corresponding to a plurality of detected faces, to cause display on the display of an image corresponding to the picture or video file in a case that the face data associated with the captured image is determined to be associated with one or more of the picture and video files.

10. The method according to claim 9, wherein each of the displayed content items is operative to enable activation of at least one device.

11. The method according to claim 9, wherein the location data is a file path.

12. The method according to claim 11, wherein the file path is to the memory.

13. The method according to claim 9, wherein the location data is a Uniform Resource Locator (URL) of the content item.

14. The method according to claim 9, wherein the content is retrieved from the Internet.

15. The method according to claim 9, wherein each of the displayed content items includes an image.

16. The method according to claim 9, wherein the preference data includes source data indicating at least one of a favorite source from which the content should be retrieved and a type of content to be displayed.

17. The method according to claim 9, further comprising providing a list of all content items currently available for display on the display of the television.

18. The method according to claim 9, further comprising displaying on the display of the television the captured image of the user.

* * * * *